Figure 1:
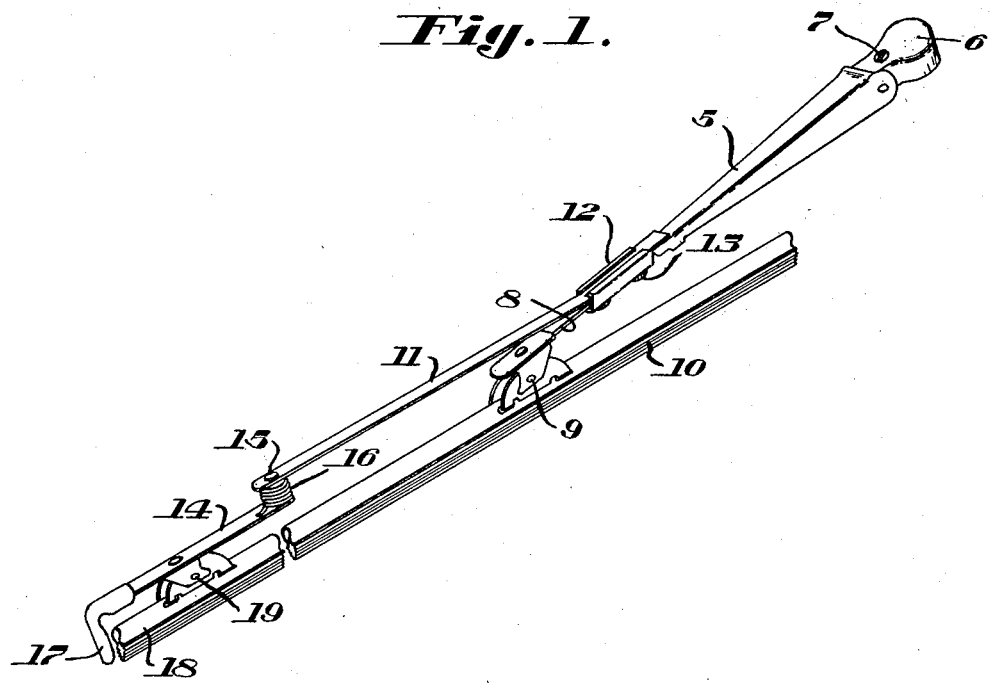

July 7, 1953   J. P. LACY   2,644,187
WINDOW WIPER
Filed Nov. 6, 1947

INVENTOR
JOHN PAUL LACY

Patented July 7, 1953

2,644,187

UNITED STATES PATENT OFFICE 2,644,187

WINDOW WIPER

John Paul Lacy, Pittsburgh, Pa.

Application November 6, 1947, Serial No. 784,419

4 Claims. (Cl. 15—255)

This invention relates to window wipers and particularly to wipers adapted to be mounted for oscillation to clean windows of limited size, as, for example, automobile windows. Such wipers are commonly applied to the front windows or windshields of automobiles.

For purposes of explanation and illustration the invention will be described as embodied in an automobile windshield wiper but it will be understood that the invention is otherwise applicable.

The ordinary automobile windshield wiper comprises an oscillatable arm having a wiper blade fastened thereto, the blade having a rubber portion engaging the outer surface of the windshield. The area of the windshield which can be wiped by such a blade is limited by engagement of the outer end of the blade with the window frame. This results in leaving unwiped areas of undesirably great size.

It has heretofore been proposd to obviate the disadvantage of the ordinary automobile windshield wiper just mentioned by forming the blade in two sections hinged together so that when the outer end of the outer section of the blade engages the frame that section can turn relatively to the inner section permitting the inner section to move into and wipe the normally unwiped area adjacent the corner of the window. However wipers with hinged or jointed blades are not satisfactory and have never gone into extensive commercial use. Such wipers could only function in the manner intended if the hinge pin or pivot between the inner and outer sections were maintained perpendicular to the windshield; but this is not feasible since efficient wiping cannot thus be accomplished. The blades should be free to turn so that the wiping portions thereof may assume an acute angle to the window in order to efficiently wipe the window. But if this should be permitted to take place when hinged blade sections are used the outer blade section would not maintain proper engagement with the window. The result is that despite the acknowledged disadvantages and inefficiencies of the ordinary single blade windshield wipers those wipers are now universally employed and undesirably great window areas are unwiped, often resulting in obscuring vision to the point of danger.

I have devised a windshield wiper obviating the disadvantages of both the ordinary single bladed windshield wiper and windshield wipers having hinged blade sections. I provide a windshield wiper comprising an oscillatable support or arm, a supplemental support or arm carried by the first mentioned support or arm and yieldably movable relatively thereto and wiping means loosely mounted on the supports or arms whereby the wiping means may assume proper operative position with respect to the window during operation of the wiper. The loose mounting of the wiping means on the supports or arms allows the wiping means to maintain proper relationship with the window in any relative angular position of the supports or arms. Preferably the supports are in the form of arms of spring metal or other suitable material, one of which is connected with an oscillatable shaft and the other of which is connected with the first and normally projects substantially longitudinally from the end thereof. The second or outer arm is preferably pivoted or articulated to the inner arm so that upon operation of the wiper it may turn relatively to the inner arm to permit the inner arm to wipe an area which would otherwise remain unwiped. The pivot or hinge pin between the arms is maintained at all times generally normal to the window. This insures that the wiping means will be effectively in any articulated position of the arms.

The wiping means preferably comprises blades loosely mounted on the respective arms. There may be one blade mounted on each arm. The blades may be of standard construction, each being pivoted to one of the arms by a pivot extending crosswise of the arm and generally parallel to the window and each also being mounted so that upon each movement of the wiper in each direction of oscillation the blade can move to lie at an acute angle to the window whereby most effectively to perform the wiping function. Preferably the inner end arm is relatively long and the outer arm is relatively short. The arms may be connected together by a pivot surrounded by a coil spring connected with the respective arms in such manner as to tend to maintain them in alignment but permitting the outer arm to turn relatively to the inner arm when the outer arm tends to lag due to frictional drag on the window or engages the window frame. The outer arm may have a projection extending at an angle thereto to engage the window frame.

Other details, objects and advantages of the invention will become apparent as the following description of a present preferred embodiment thereof proceeds.

Figure 2:
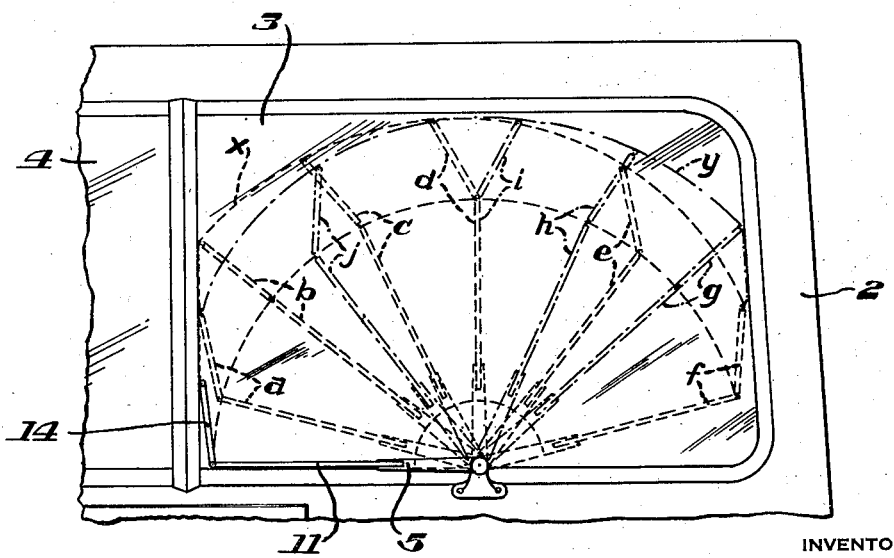

In the accompanying drawings I have shown a present preferred embodiment of the invention in which Figure 1 is a perspective view of a windshield wiper; and Figure 2 is a fragmentary view of the front of an automobile showing a windshield wiper of the type shown in Figure 1 installed on the automobile.

Referring now more particularly to the drawings, the automobile to which the windshield wiper is attached in Figure 2 is designated generally by reference numeral 2. The automobile has two front or windshield windows 3 and 4. The automobile is provided with an oscillatable shaft substantially at the center of the bottom edge of the window 3 and whose axis may be generally normal to the plane of the window. The shaft may be oscillated by any suitable means, as, for example, the usual suction device operated from the manifold of the engine. The present invention is concerned only with the wiper per se and not with the means for oscillating it.

The wiper comprises an inner arm or support 5 which may be of standard construction and adapted for connection with the oscillatable shaft through a connecting device in the head 6 operated by a screw 7. The arm 5 has an extension 8 to which is loosely connected at 9 in usual manner a wiper blade 10. The wiper blade 10 may turn relatively to the extension 8 both in and transverse of the plane of the blade and it may also tilt so that it is inclined to the window at an acute angle upon oscillation of the wiper in each direction. The arm 5 has a second extension or supplemental support 11 fastened thereto by a clamp 12. The extension 11 is longitudinally adjustable by loosening the screws 13 of the clamp 12, moving the extension to the desired adjusted position and then tightening the screws.

A second arm or extension 14 is pivoted to the extension 11 at 15, a coil spring 16 being disposed about the pivot with one end connected to the extension 11 and the other end connected to the arm 14 so as normally to tend to maintain the arm 14 in generally longitudinal alignment with the extension 11 but at the same time permit the arm 14 to turn relatively to the extension 11 when the arm 14 tends to lag due to frictional drag on the window or strikes an obstruction such as the window frame. The arm 14 has a projection 17 extending at an angle thereto and toward the window and adapted to engage the window frame when the wiper is in use. A relatively short wiper blade 18 is connected to the arm 14 at 19 in the same manner as the blade 10 is connected to the extension 8. When the arm 14 is in generally longitudinal alignment with the extension 11 the blades 10 and 18 are in longitudinal alignment as shown in Figure 1.

The members 11 and 14 together with the connection therebetween constitute an elongated member of which the member 11 is the body portion and the member 14 is an extension portion.

The manner in which my windshield wiper operates is shown in Figure 2. In that figure the wiper is shown in various operative positions. In solid lines it is shown in the position which it assumes when at rest and not in use. The arm 5 with its extensions 8 and 11 and the blade 10 lie substantially parallel to and against the bottom of the window frame. The extension 14 and the blade 18 lie at an angle closely approaching a right angle to the extension 11 with the projection 17 engaging the side of the window frame at the center of the windshield, being maintained in such engagement by the spring 16. Thus when the wiper is in inoperative position it is out of the way and does not obscure vision through the window.

When the wiper is placed in operation the oscillatible shaft which carries the arm 5 is set into oscillation. From the solid line inoperative position of Figure 2 the wiper swings clockwise about the axis of its shaft. The various positions of the wiper in its clockwise movement are shown in Figure 2 by dotted lines while the various positions of the wiper in its counterclockwise movement are shown in Figure 2 by chain lines. The successive operative positions of the wiper in its first clockwise and counterclockwise cycle after starting up from its solid line rest position are shown respectively at $a$, $b$, $c$, $d$, $e$, $f$, $g$, $h$, $i$, and $j$ in Figure 2. As the clockwise movement of the wiper commences the blades move from the solid line position to the $a$ position, the spring 16 maintaining the projection 17 against the side of the frame. Clockwise movement continues to the $b$ position, the projection 17 still being maintained by the spring 16 against the side of the frame until the blades are in approximate longitudinal alinement. From that point the projection 17 parts contact with the frame. As the blade moves from the $b$ position to the $c$ position the outer blade begins to lag due to frictional drag on the window. The amount of lag can be controlled by the tension of the spring 16. Generally I prefer about the amount of lag indicated in Figure 2 as this makes for smooth, efficient operation. Due to the lag of the outer blade its angle with the inner blade gradually decreases as shown respectively at the $d$, $e$ and $f$ positions. The $f$ position is the extreme position of the wiper in its clockwise movement. The end of the outer blade is shown slightly spaced from the frame to indicate that at the end of its oscillatory movement the wiper may not always touch the frame. Whether or not it touches the frame depends upon the spring tension and the characteristics of movement imparted to the wiper by the operating shaft.

From the $f$ position the wiper starts back in counterclockwise movement. If the projection 17 is not in engagement with the window frame at the extreme limit of clockwise movement it will immediately engage the window frame as the wiper starts back in counterclockwise movement and will ride up along the window frame until the $g$ position is reached. That position in counterclockwise movement corresponds to the $b$ position in clockwise movement. The characteristics in counterclockwise movement are the same as in clockwise movement, the $h$ position in counterclockwise movement corresponding to the $c$ position in clockwise movement, the $i$ position in counterclockwise movement corresponding to the $d$ position in clockwise movement and the $j$ position in counterclockwise movement corresponding to the $e$ position in clockwise movement. There is no position in counterclockwise movement shown in Figure 2 which exactly corresponds with the $f$ position in clockwise movement but the $a$ position roughly corresponds thereto. The $a$ position is shown as a position roughly corresponding to the extreme limit of counterclockwise movement except that on every cycle after the first the projection 17 does not necessarily engage the inner side of the frame, the reason being the same as above explained with respect to engagement or nonengagement of the projection 17 with the outer side of the frame in clockwise movement.

It will be noted that if the inner and outer blades were in exact longitudinal alinement at the d and i positions the total length of the wiper would be greater than the upright dimension of the window. However in operation the blades will not ordinarily be in longitudinal alinement when the wiper is at its central position as the outer blade will lag behind the inner blade as explained above and as shown in Figure 2.

The dotted line x indicates the trace in the plane of the window of the projection 17 when the wiper is moving in the clockwise direction. The chain line y indicates the trace in the plane of the window of the projection 17 when the wiper is moving in the counterclockwise direction. Thus it will be seen that the wiper is highly efficient in that it wipes a greater area than could possibly be wiped with a single blade, this being true between the b and g positions as well as below those respective positions.

While I have shown and described a present preferred embodiment of the invention, it is to be distinctly understood that the invention is not limited thereto but may be otherwise variously embodied within the scope of the following claims.

I claim:

1. A window wiper comprising a pivotally mounted support, a supplemental support, a resilient connection between the supports permitting relative yieldable movement thereof generally in a plane containing the axis of the pivotal mounting for the first mentioned support and wiping means connected with the supports.

2. A window wiper comprising a pivotally mounted elongated primary support, an elongated supplemental support, a resilient connection between the primary and supplemental supports permitting relative yieldable movement thereof generally in a plane containing the axis of the pivotal mounting for the primary support, an extension, a pivotal connection between the supplemental support and the extension, wiping means and a mounting for the wiping means on each of the primary support and the extension.

3. A window wiper attachment comprising an elongated member adapted to be connected with an oscillatable wiper arm carrying a wiping element so as to project substantially beyond the outer end of the wiper arm and the wiping element carried thereby, the elongated member comprising a body portion and an extension portion and a joint between the body portion and the extension portion normally maintaining said portions in predetermined angular relationship but yieldable to permit turning of the extension portion relatively to the body portion, and a wiping element carried by the extension portion.

4. A window wiper attachment comprising an elongated member adapted to be connected with an oscillatable wiper arm carrying a wiping element so as to project substantially beyond the outer end of the wiper arm and the wiping element carried thereby, the elongated member comprising a body portion and an extension portion and a joint between the body portion and the extension portion normally maintaining said portions in predetermined angular relationship but yieldable to permit turning of the extension portion relatively to the body portion, and a wiping element carried by the extension portion, the extension portion having a terminal part adapted to engage a window frame whereby to turn the extension portion relatively to the body portion during operation of the wiper.

JOHN PAUL LACY.

References Cited in the file of this patent

UNITED STATES PATENTS

| Number | Name | Date |
| --- | --- | --- |
| 743,801 | Anderson | Nov. 10, 1903 |
| 1,565,802 | Hush | Dec. 15, 1925 |
| 1,694,245 | Baker | Dec. 4, 1928 |
| 2,160,736 | Horton | May 30, 1939 |
| 2,185,572 | Sawyer | Jan. 2, 1940 |